(12) United States Patent
Seth

(10) Patent No.: US 12,430,388 B1
(45) Date of Patent: Sep. 30, 2025

(54) AI-BASED PERSONALIZED BULK DESIGN CONTENT CREATION

(71) Applicant: Microsoft Technology Licensing, LLC, Redmond, WA (US)

(72) Inventor: Rolly Seth, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/653,216

(22) Filed: May 2, 2024

(51) Int. Cl.
  *G06F 16/90* (2019.01)
  *G06F 16/903* (2019.01)
  *G06F 16/9038* (2019.01)

(52) U.S. Cl.
  CPC .... *G06F 16/90335* (2019.01); *G06F 16/9038* (2019.01)

(58) Field of Classification Search
  CPC ....................... G06F 16/90335; G06F 16/9038
  See application file for complete search history.

(56) References Cited

U.S. PATENT DOCUMENTS

| | | | |
|---|---|---|---|
| 11,962,546 B1 | 4/2024 | Hattangady | |
| 2013/0339498 A1* | 12/2013 | Johnson | H04L 67/104 709/221 |
| 2015/0347971 A1* | 12/2015 | D'Amore | G06Q 10/101 705/300 |
| 2020/0065857 A1 | 2/2020 | Lagi | |
| 2020/0258420 A1* | 8/2020 | Kurani | G06N 3/045 |
| 2021/0042830 A1* | 2/2021 | Burke | G06Q 20/341 |
| 2021/0258350 A1* | 8/2021 | Buck | H04L 63/0272 |
| 2021/0326528 A1 | 10/2021 | Kemp et al. | |
| 2023/0419577 A1* | 12/2023 | Garbos | B42D 15/045 |
| 2024/0119685 A1* | 4/2024 | Humphrey | G06F 3/0482 |
| 2024/0370931 A1* | 11/2024 | Scavo | G06F 40/166 |
| 2024/0379019 A1* | 11/2024 | Naufel | G06N 3/0895 |
| 2024/0412720 A1* | 12/2024 | Vasylyev | G06F 16/90332 |

OTHER PUBLICATIONS

International Search Report and Written Opinion received for PCT Application No. PCT/US2025/016970, mailed on Jun. 17, 2025, 16 pages.

\* cited by examiner

*Primary Examiner* — Merilyn P Nguyen
(74) *Attorney, Agent, or Firm* — NovoTechIP International PLLC

(57) ABSTRACT

A data processing system implements receiving, from a sender device, a request to personalize and distribute a design content item based on content consumption needs and/or preferences of recipients, wherein the content consumption needs and/or preferences include a data type; constructing a prompt by appending the design content item and the content consumption needs and/or preferences to an instruction string, the instruction string including instructions to a generative model to transform per recipient the design content item into a personalized content item based at least one of a content consumption need or a content consumption preference of a respective recipient; providing as an input the prompt to the generative model and receiving as an output the personalized content item from the generative model; providing the personalized content item to a recipient device; and causing a user interface of the recipient device to render the personalized content item.

20 Claims, 8 Drawing Sheets

AI-BASED PERSONALIZED BULK DESIGN CONTENT CREATION

BACKGROUND

Artificial intelligence (AI) has the potential to automate our lives to save time and increase productivity. One area of interest is personalized design content creation and sharing. However, a lot of existing AI-based personalized bulk design content creation platforms or applications only support sharing the same design content item with different recipients, whether it is a thank you note or a holiday greeting card. However, different users often have different preferences or needs. For example, a blind recipient prefers an audio holiday greeting card. Hence, there is a need for AI-based personalized bulk design content creation systems and methods that support sharing a design content item transformed or modified for different recipients based on their content consumption needs or preferences.

SUMMARY

An example data processing system according to the disclosure includes a processor and a machine-readable medium storing executable instructions. The instructions when executed cause the processor alone or in combination with other processors to perform operations including receiving, from a first device associated with a sender, a request to personalize and distribute a design content item based on at least one of content consumption needs or content consumption preferences of a plurality of recipients, wherein the at least one of the content consumption needs or the content consumption preferences include a data type; constructing, via a prompt construction unit, a first prompt by appending the design content item and the at least one of the content consumption needs or the content consumption preferences to a first instruction string, the first instruction string including instructions to a generative model to transform per recipient the design content item into a personalized content item based at least one of a content consumption need or a content consumption preference of a respective recipient; providing as an input the first prompt to the generative model and receiving as an output the personalized content item from the generative model; providing the personalized content item to a second device associated with the respective recipient; and causing a user interface of the second device to render the personalized content item.

An example method implemented in a data processing system includes receiving, from a first device associated with a sender, a request to personalize and distribute a design content item based on at least one of content consumption needs or content consumption preferences of a plurality of recipients, wherein the at least one of the content consumption needs or the content consumption preferences include a data type; constructing, via a prompt construction unit, a first prompt by appending the design content item and the at least one of the content consumption needs or the content consumption preferences to a first instruction string, the first instruction string including instructions to a generative model to transform per recipient the design content item into a personalized content item based at least one of a content consumption need or a content consumption preference of a respective recipient; providing as an input the first prompt to the generative model and receiving as an output the personalized content item from the generative model; providing the personalized content item to a second device associated with the respective recipient; and causing a user interface of the second device to render the personalized content item.

An example non-transitory computer readable medium data processing system according to the disclosure on which are stored instructions that, when executed, cause a programmable device to perform functions of receiving, from a first device associated with a sender, a request to personalize and distribute a design content item based on at least one of content consumption needs or content consumption preferences of a plurality of recipients, wherein the at least one of the content consumption needs or the content consumption preferences include a data type; constructing, via a prompt construction unit, a first prompt by appending the design content item and the at least one of the content consumption needs or the content consumption preferences to a first instruction string, the first instruction string including instructions to a generative model to transform per recipient the design content item into a personalized content item based at least one of a content consumption need or a content consumption preference of a respective recipient; providing as an input the first prompt to the generative model and receiving as an output the personalized content item from the generative model; providing the personalized content item to a second device associated with the respective recipient; and causing a user interface of the second device to render the personalized content item.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
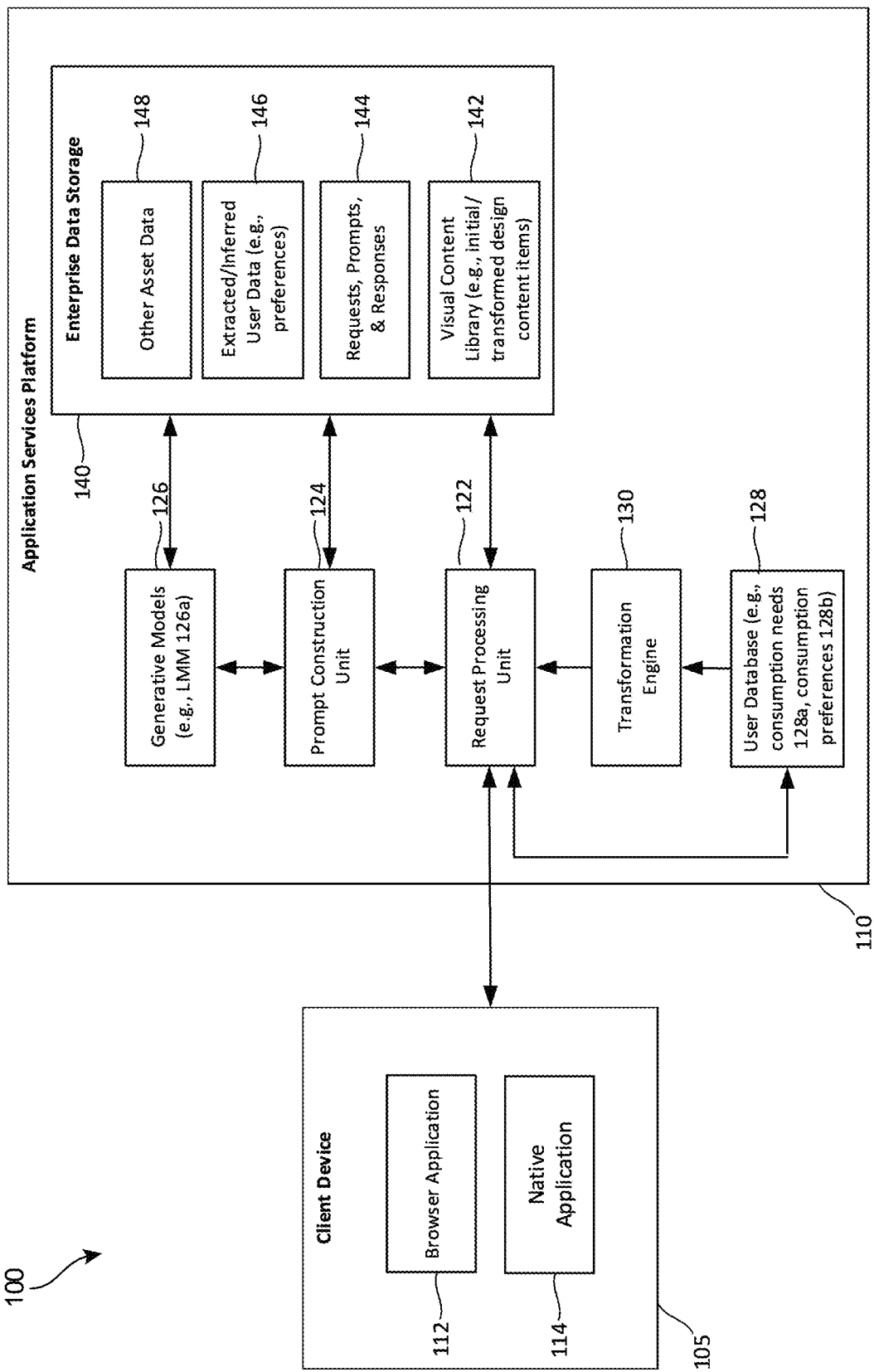
FIG. 1 is a diagram of an example computing environment in which the techniques for AI-based bulk design content creation based on personal consumption needs/preferences are implemented.

Systems and methods for AI-based bulk design content creation based on personal consumption needs/preferences are described herein. These techniques provide a technical solution to the technical problem of lack of fast and easy AI-based personalized bulk design content creation systems and methods that use generative AI to modify/transform a design content item in bulk, based on individual recipient consumption needs/preferences. The existing AI-based personalized bulk design content creation systems automate many design tasks that were previously done manually, such as design content creation prompt generation, content item template generation, and the like. However, these systems simply do not support generating the design content item personalized for different recipient consumption needs/preferences.

To address these issues, the proposed technical solution improves design content creation using generative model(s) by applying a multimodal model (LMM) that automatically modifies/transforms a design content item in bulk based on individual recipient consumption needs/preferences. Such content consumption needs are caused, for example, by physical disabilities, language barriers, cognitive barriers (e.g., overly technical language, dense text, or information presented in formats that are difficult to understand), or the like. Physical disabilities include visual impairments, mobility limitations (difficulty using a mouse or keyboard), auditory impairments, learning disabilities (people with dyslexia or other learning disabilities might struggle with complex sentence structures or large blocks of text), cognitive disabilities, and the like. Content consumption preference can be caused by physical preferences, language preferences, and/or cognitive preferences of recipients. Content consumption needs are driven by what the users need to have from content, while preferences reflect what the users enjoy.

The content transformation solutions presented herein provide an improved method for distributing generative AI creations, e.g., content from a generative AI model such as GPT-4 or Dall-E, in which the creation is sent in bulk to a group of recipients by transforming the content according to the personalized consumption needs/preferences of each recipient. An aspect includes a system architecture (e.g., of a public-facing service) that allows for bulk distribution of generative AI creations via transforming the creations according to the personalized consumption needs/preferences of each recipient. Another aspect includes a user experience (UX) in which a bulk distribution of the AI creation is done in a way that automatically transforms the AI creation according to the personalized consumption choices of each recipient that provides a tangible output for the system described above in the form of more personalized generative AI creations.

The system described herein provides a novel AI-based personalized bulk design content creation service designed to streamline personalized bulk design content creation. This service eliminates the need for manually writing design content transformation prompts, and enables users to directly create personalized bulk design content items for a plurality of recipients with different content consumption needs and/or preferences. The service autonomously executes the processes of design content creation behind the scenes. This service not only simplifies the workflow but also enhances the accessibility and efficiency of design content creation to recipients with different content consumption needs and/or preferences.

The system applies a large multimodal model (LMM, e.g., GPT-4V) to provide an easy-to-use user experience (UX) related to personalized bulk design content creation that can be shared via any systems, platforms, or applications (e.g., Google Workspace®, Copilot®, Teams®, Designer®, and the like).

A technical benefit of the approach provided herein is providing an AI-based personalized bulk design content creation service that takes initial design content item(s) (e.g., an event invention) and recipient content consumption needs and/or preferences at runtime into account to produce transformed/personalized content items for the recipients. The automated personalized bulk design content creation can accept any initial design content item, thereby improving the recipient experience.

Another technical benefit of the approach provided herein is to capitalize on a suite of powerful tools to transform the initial design content item into formats/data types accessible by respective recipients (e.g., blindness). Therefore, the generated personalized content items meet the recipient content consumption needs and/or preferences. Not only does this improve the productivity of the sender, but this approach can also increase the recipients' access to design content items.

Another technical benefit of the approach provided herein is to significantly improve the user experience in personalized bulk design content creation within any platforms/applications when the user signs up toother platforms/applications for the first time or at any point when the user desires to share an initial design content item with a plurality of recipients with different content consumption needs and/or preferences.

Another technical benefit of this approach is storing the initial/transformed design content items in the system thereby saving the user significant time and effort in creating and sharing similar design content items in the future. These and other technical benefits of the techniques disclosed herein will be evident from the discussion of the example implementations that follow.

FIG. 1 is a diagram of an example computing environment 100 in which the techniques herein may be implemented. The example computing environment 100 includes a client device 105 and an application services platform 110. The application services platform 110 provides one or more cloud-based applications and/or provides services to support one or more web-enabled native applications on the client device 105. These applications may include but are not limited to AI-based personalized bulk design content creation applications, presentation applications, website authoring applications, collaboration platforms, communications platforms, and/or other types of applications in which users may create, view, and/or modify various types of graphic designs personalized in bulk based on individual recipient content consumption needs or preferences. In the implementation shown in FIG. 1, the application services platform 110 also applies generative AI to easily transform/modify fast and satisfactory individualized design content items in bulk based on an initial/sender design content item according to the techniques described herein. The client device 105 and the application services platform 110 communicate with each other over a network (not shown). The network may be a combination of one or more public and/or private networks and may be implemented at least in part by the Internet.

The client device 105 can be a sender device as well as a recipient device of a user that subscribes to an AI-based personalized bulk design content creation service provided via the application services platform 110. The service prompts a user of the client device 105 to register the user's content consumption needs and/or preferences during service registration. The user's content consumption needs and/or preferences for sending can be different from those for receiving. In addition, the service can automatically update the user's content consumption needs and/or preferences based on user feedback (from senders and/or recipients) on the bulk design content outputs.

The client device 105 is a computing device that may be implemented as a portable electronic device, such as a mobile phone, a tablet computer, a laptop computer, a portable digital assistant device, a portable game console, and/or other such devices in some implementations. The client device 105 may also be implemented in computing devices having other form factors, such as a desktop computer, vehicle onboard computing system, a kiosk, a point-of-sale system, a video game console, and/or other types of computing devices in other implementations. While the example implementation illustrated in FIG. 1 includes a single client device 105, other implementations may include a different number of client devices that utilize services provided by the application services platform 110.

The design content item transformation or modification changes consumption attributes for individual recipients while maintaining the factual content and general design/theme of an initial/sender design content item. For instance, when the initial design content item is a video animation card, the service automatically changes the video animation card to an audio card for blind recipients. As another instance, the service automatically changes the video animation card to recipient visible color options for color-blind recipients. The transformation or modification makes design content items more accessible. The consumption attributes refer to data type (e.g., text, image, audio, video, anomation, or the like), design attributes (e.g., font type, font size, color palette, texture, composition, layout, level of details, level of abstraction, overall mood, atmosphere, or the like), communcation channel (e.g., email, text message, voice message, video message, file sharing, or the like), and the like.

The term "design content item" refers to any human comprehensible digital design content item. Common forms of digital design content items include photos, diagrams, charts, images, infographics, videos, animations, screenshots, memes, slide decks, pictograms, ideograms, gaming interfaces, software application backgrounds, graphic designs (e.g., publication, email marketing templates, PowerPoint presentations, menus, social media advertisements, banners and graphics, marketing and advertising, packaging, visual identity, art and illustration graphic design, and the like), audio books, lectures and speeches, podcasts, interviews, news broadcasts, radio programs, audio courses, albums and songs, audio dramas and performances, soundtracks and scores, instrumental music composed for movies, games, or other media, audio guides, and the like.

Although various embodiments are described with respect to vision and hearing design content items, it is contemplated that the approach described herein may be used with other design content items involving touch, smell, and taste. For example, a digital scent device can release odor for a recipient to "smell" what is in a design content item, and a kinesthetic haptic device can make a recipient feel touching or holding objects in a design content item.

A visual content "theme" is a unifying concept or idea that guides the visual elements of a design project. It helps to convey a specific message or atmosphere and create a cohesive and consistent look and feel for the project. Common elements of a visual content theme include color palette, typography, imagery (e.g., photographs, illustrations, or icons), layout, style (e.g., minimalist, retro, or modern), and the like.

The client device 105 includes a native application 114 and a browser application 112. The native application 114 is a web-enabled native application, in some implementations, which provides AI-based personalized bulk design content creation. The web-enabled native application utilizes services provided by the application services platform 110 including but not limited to creating, viewing, and/or modifying various AI-based personalized bulk design content creation. The native application 114 implements user interfaces shown in FIGS. 3A-3C in some implementations. In other implementations, the browser application 112 is used for accessing and viewing web-based content provided by the application services platform 110. In such implementations, the application services platform 110 utilizes one or more web applications, such as the browser application 112, that enables users to view, create, and/or modify AI-based personalized bulk design content creation using, for example, an online application. The browser application 112 implements the user interfaces shown in FIGS. 3A-3C in some implementations. The application services platform 110 supports both the native application 114 and the browser application 112 in some implementations, and the users may choose which approach best suits their needs.

The application services platform 110 includes a request processing unit 122, a prompt construction unit 124, generative model(s) 126, a user database 128, a transformation engine 130, an enterprise data storage 140, and moderation services (not shown).

The request processing unit 122 is configured to receive requests from the native application 114 and/or the browser application 112 of the client device 105. The requests may include but are not limited to personalizing in bulk an initial/sender design content item based on individual recipient content consumption needs or preferences according to the techniques provided herein.

Figure 2:
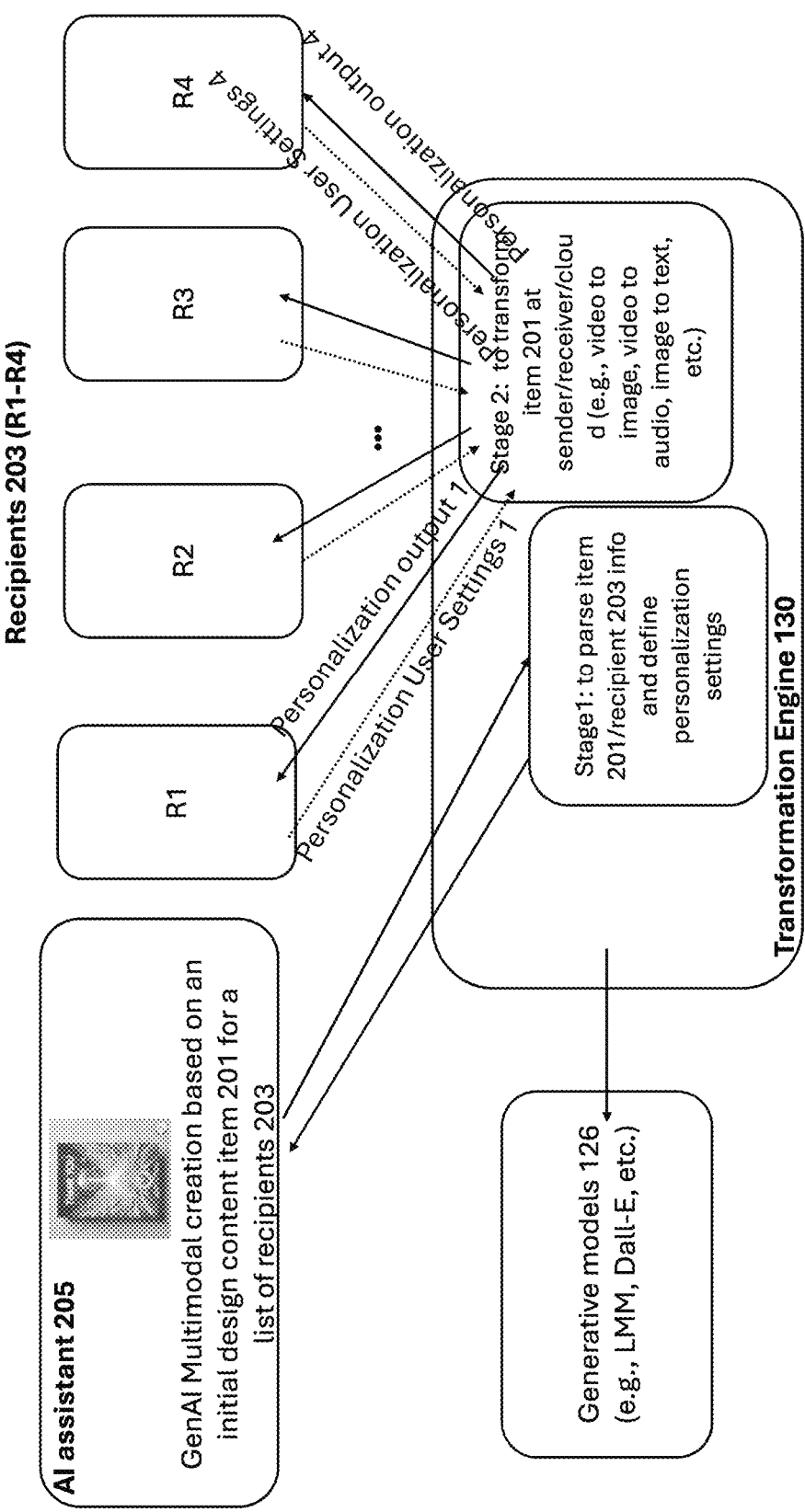
FIG. 2 is a conceptual diagram of an AI-based personalized bulk design content creation service of the system of FIG. 1 according to principles described herein.

FIG. 2 is a conceptual diagram of an AI-based personalized bulk design content creation service of the system of FIG. 1 according to principles described herein. The service leverages the advanced capabilities of LMMs and LVMs in the AI-based personalized bulk design content creation service. This service is designed to transfer an initial design content item 201 for a list of recipients 203 (e.g., R1, R2, R3, R4) into a plurality of transformed design content items based on recipient's content consumption needs or preferences, in repose to a sender request received via an AI assistant 205 (e.g., Microsoft Copilot). In one embodiment, the service deploys the transformation engine 130 to execute the transformation in two stages. The initial design content item 201 can be provided by a sending user, or a third-party online service, such as an online advertising service.

At Stage 1, the transformation engine 130 parses the initial design content item 201 for a design theme, factual content (e.g., textual content, such as "thank you" on the thank-you card in FIG. 2). The transformation engine 130 also parses information of the recipients 203 (e.g., from the user database 128) thereby defining personalization settings, including the recipient content consumption needs or preferences (caused by physical disabilities, language barriers, cognitive barriers, or the like of the recipients), or content consumption preferences (caused by physical preferences, language preferences, cognitive preferences, or the like of the recipients). For those recipients who have not yet subscribed to the AI-based personalized bulk design content creation service, or those recipients who have subscribed but did not provide individual recipient content consumption needs or preferences, the service can query the recipients for the information. Alternatively, the service can extract or infer such information from existing recipient information in the system as well as other publicly available information of the recipients (such as news, recipients' blogs, articles, affiliations with certain non-profit organizations, social media groups, on-line discussion groups, or the like).

At Stage 2, the transformation engine 130 works in conjunction with the generative model 126 (e.g., LMM, Dall-E, etc.) to transform the initial design content item 201 at a sender device, a recipient device, a cloud, or a combination thereof (e.g., video to image, video to audio, image to text, etc.) based on the recipient content consumption needs or preferences.

For example, in response to a user prompt "create a Happy New Year card for my global team reporting to me and send them personalized name cards in their native language", the system fetches team members name and location information from a company address book and finds there are 6 team members in four different geo-locations. The system then calls the LMM 126a (e.g., GPT-4V) to execute the AI-based personalized bulk design content creation based on a meta prompt such as the one displayed in Table 1. The meta prompt can be adapted or extended based on different implementations, such as different generative models.

TABLE 1

Create a Happy New Year card for user global team reporting to user and send recipients personalized name cards in their native language.
Create a copy of Happy New Year design in 4 languages - English, Hindi, Chinese, German. Hindi card will be for Seema, English for Alex, Chinese for Su and German language card for Susie.
Download fonts for English, Hindi, Chinese and German languages
Replace all text in native language
Replace name heading on the card with specific member name
Check no regional or culturally specific design (image or text) issue exists As another example, in response to a user prompt "create a colorful team morale invitation and also personalize for a person with visually impairment and color blindness (user cannot see red color)", the system re-uses the team members name and location information, and calls the LMM 126a to execute the AI-based personalized bulk design content creation based on a meta prompt such as the one displayed in Table 2.

TABLE 2

Create a colorful team morale invitation and also personalize for a person with visually impairment and color blindness (user cannot see red color).
For designs for color blindness, create a copy of the original design and replace the color in the design that the user cannot see with a complementary color.
For designs for visual impairment, create an audio file of the invite giving all the finalized details of the event and also the aesthetics of the invite in voice format.

In another embodiment, the meta prompts in Table 1 include a negative prompt to steer the LMM 126a away from generating undesirable content. A negative prompt is the opposite of a positive prompt, which is used to guide the model towards generating the specific type of content. For instance, the meta prompt can include a negative prompt to avoid generating a "blurry," "pixelated," "low quality," "violent," or "hateful" image.

In some implementations, the client device 105 can deploy small generative models, well-suited for situations where computational resources are limited. Example small generative models include Variational Autoencoders (VAEs) with Low-Dimensional Latents, PixelRNN and its Variants, Generative Adversarial Networks (GANs) with Reduced Complexity, Grammar-based models, Markov Chain Models, and the like. Additionally, generative models such as MobileDiffusion, and Generative Adversarial Networks (GANs) may be used for mobile devices:

Finally, the system incorporates a result check through the LMM 126a to ensure that the final generated design content items contain the key features from the initial/sender design content item and match the respective recipient content consumption needs and/or preferences. Outputs that pass the quality check are then delivered to the recipients. Due to latency concerns, an alternative method for the quality check involves parsing another recipient information to define personalization settings while transforming the design content item for the first recipient, or simply transforming the design content item into the outputs for a lot of recipients in parallel.

The system provides users with the ability to generate personalized design content items in bulk with an unlimited range of design contents, thereby increasing the accessibility of a sender design content item meeting respective recipient content consumption needs and/or preferences.

In some implementations, each generative model call needs to pass a responsible AI test. In one embodiment, a responsible AI test is a comprehensive evaluation process that ensures a generative model adheres to ethical principles and operates safely and fairly in the real world. In another embodiment, the test not only checks if the generative model performs its intended task accurately, but also assess its potential for harm and mitigating negative impacts. For instance, the meta prompts in Table 1 can be modified by a self-improving agent that can modify its own instructions based on its reflections on user interactions. In one embodiment, the meta prompt can include instructions that guides the agent on how to improve its own instructions based on user positive, neutral, or negative feedback on the outputs, such as a user selection of a thumbs-up tab, a thumbs-down tab, a neutral tab, or a generating-more-image tab, a textual input, and the like. The system can then create another personalized design content item based on the refined textual prompt, and serve the refined output to the recipient.

In yet another embodiment, the system further improves the quality of the outputs via a quality check to ensure that the personalized design content items contains the text and theme of the initial design content item. The system can then send the personalized design content items to the recipient. In some implementations, the service makes the personalized design content items editable by the sender and/or recipient(s), such as by adding textual content in the personalized design content items, thus offering more user control over their AI-generated content (AIGC) experiences.

In another embodiment, the prompt construction unit 124 can use user data from various user data source(s) to generate recipient design content consumption needs or preferences details. For instance, user preference data 128a can be digitized and stored in the user database 128. The user data can include a username, a user organization, a user preferred graphic design style (e.g., minimalism, retro, art deco, Memphis design, Swiss style, Bauhaus, pop art, punk, etc.), and the like. The user data source(s) can be online/offline databases (e.g., emails, social media posts, and the like), documents, articles, books, presentation content, and/or other types of content containing user activity information.

Figure 3A:
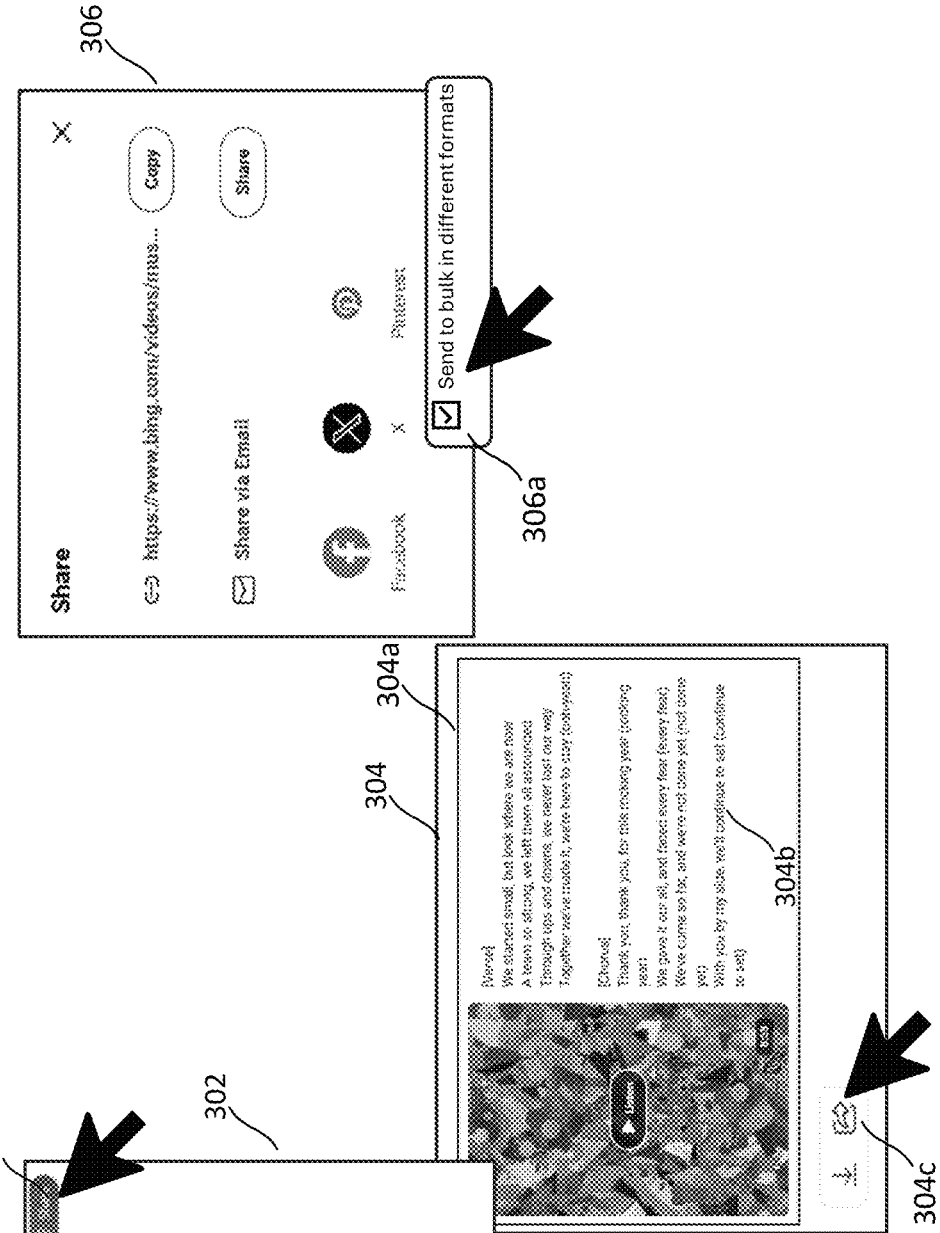
FIGS. 3A-3C are diagrams of example user interfaces of an AI-based personalized bulk design content creation application that implements the techniques described herein.
Figure 3B:
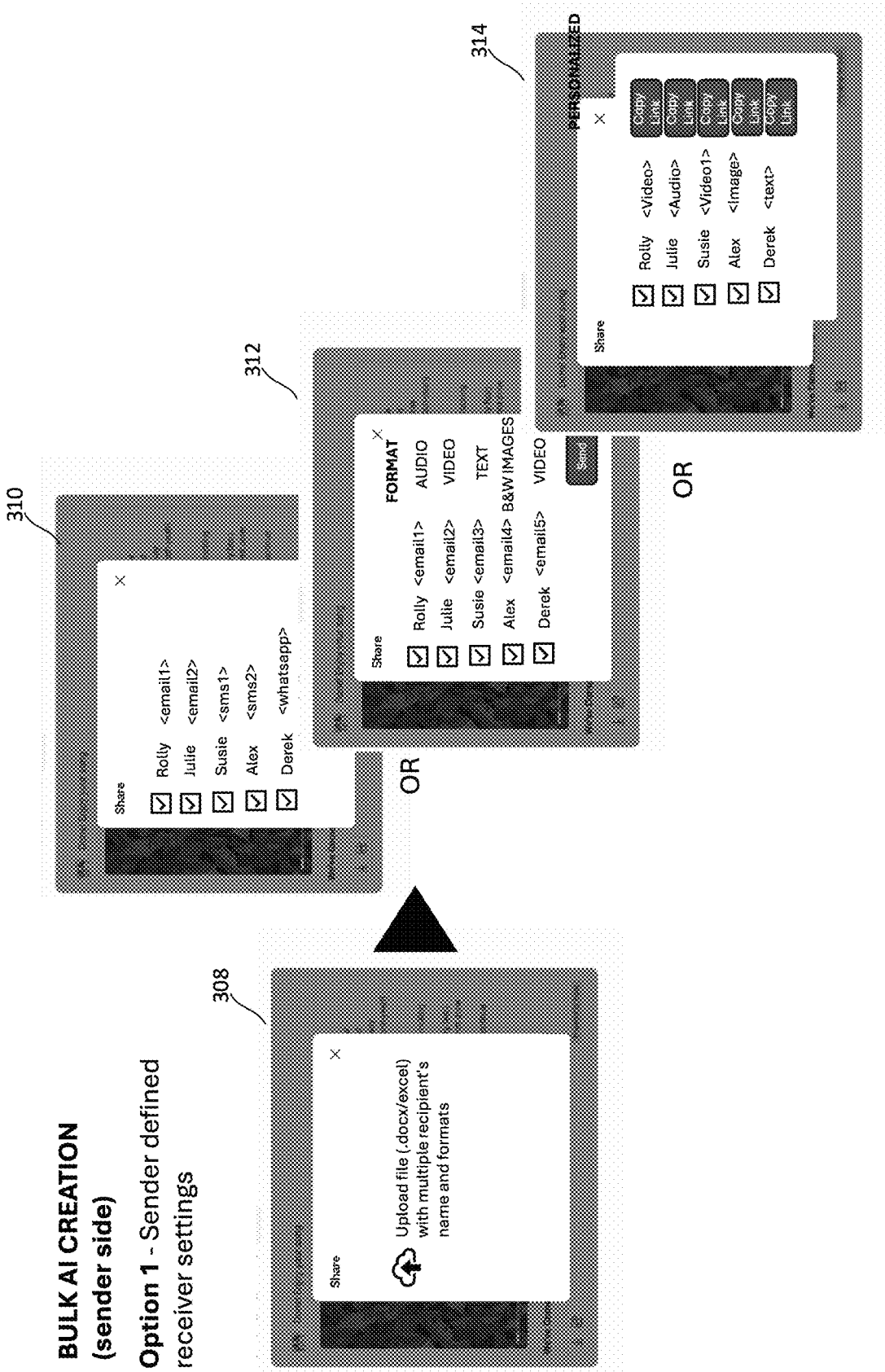
Figure 3C:
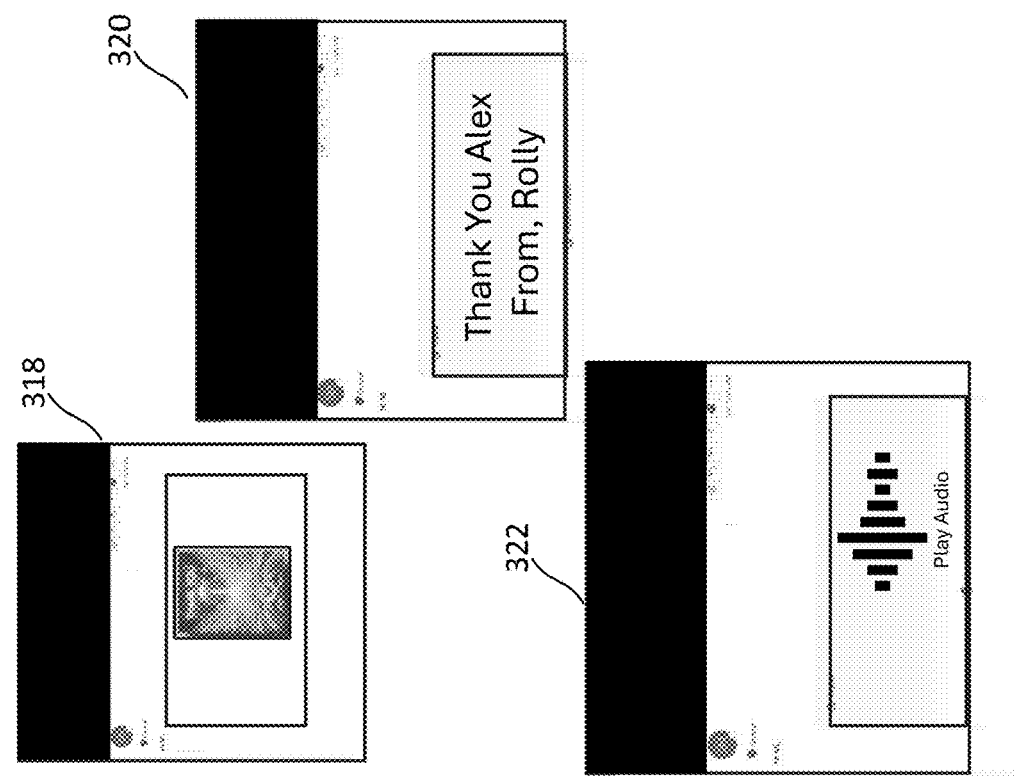
Figure 3C:
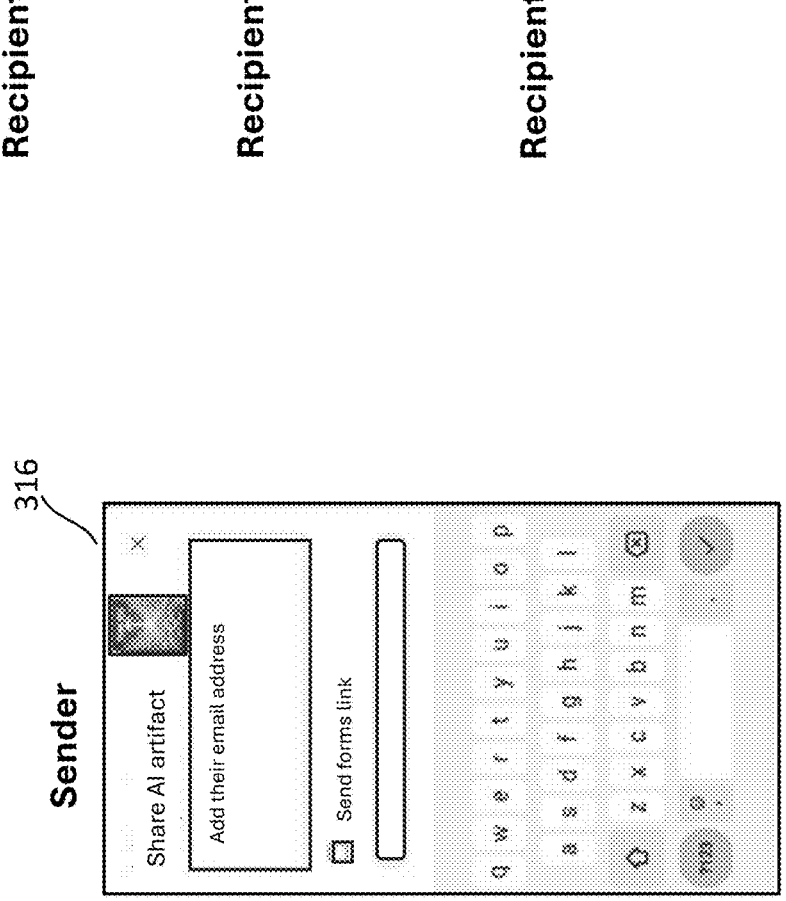

FIGS. 3A-3C are diagrams of an example user interface of an AI-based personalized bulk design content creation application that implements the techniques described herein. The example user interface shown in FIGS. 3A-3C is a user interface of an AI-based personalized bulk design content creation application within an AI-based design platform, such as but not limited to Microsoft Copilot®. However, the techniques disclosed herein for AI-based personalized bulk design content creation are not limited to use in an AI-based design platform and may be used to generate personalized bulk design content items for other types of applications including but not limited to presentation applications, website authoring applications, collaboration platforms, communications platforms, and/or other types of applications in which users create, view, and/or modify various personalized bulk design content items. Such applications can be a stand-alone application, a plug-in or a Share button of any application on the client device 105, such as the browser application 112, the native application 114, and the like. For example, the system can work on the web or within a virtual meeting and collaboration application (e.g., Microsoft Teams®) or an email application (e.g., Outlook®). The system can be integrated into the Microsoft Viva® platform or could work within a browser (e.g., Windows® Edge®). The system can also work within a social media website/application (e.g., Facebook®, Instagram®).

FIG. 3A shows a simplified process for a multimodal mode to create personalized design content item in bulk in an AI assistant application. In a user interface (UI) 302, a sender entered a request: "create an image of Thank You Card designed in a surreal holographic glowing pastel style." The AI Assistant replied: "I will try to create." Then a Thank You card 302b in a surreal holographic glowing pastel style was displayed in a content pane 302a in the UI 302. The content pane 302a also shows a Share button 302c at the right-hand top conner and style buttons for the user to select, such as Pixel art, Watercolor, Block print, Steampunk, or the like at the bottom.

In a UI 304, the sender entered a request: "create a song with Suno to thank the team for a rocking year." The AI Assistant replied: "Your song to thank the team for a rocking year has been created! You will be able to listen to it shortly." Then a Thank You song 304b was displayed with the lyric in a content pane 304a in the UI 304. The lyric said: "[Verse] We started small, but look where we are now A team so strong, we left them all astounded Through ups and downs, we never lost our way Together we've made it, we're here to stay (ooh-yeah) . . . " The content pane 304a also shows a Share button 304c at the left-hand bottom conner. In this step, a thank-you note including the Thank You card 302b and the Thank You song 304b was created.

In step 2, the user selected the Share button 304c to instruct the AI Assistant 205 to share the thank-you note. A UI 306 displayed on top of the UI 304 shows an option 306a of "Send in bulk & personalized." The AI Assistant 205 then generated and distributed to the team members personalized thank-you notes based on their respective content consumption needs and/or preferences. Since the thank-you note was work-related, the AI Assistant 205 distributed the personalized thank-you notes via work-related channels, unless any recipient has contrary needs/preferences. For example, the personalized thank-you notes can be sent via work emails, a team collaboration application (Teams), etc. Rather than sending the actual multimedia file, AI Assistant 205 created individual uniform resource locator (URL) for each personalized thank-you note, and sent the individual URLs. This significantly reduces communication load and allows recipients with the same content consumption needs and/or preferences to share the same URL.

The sender selected the Share button 302c to send Thank You Card 302b to a bulk audience at once. FIG. 3B shows multiple ways of how bulk audience details/preferences could be defined at the sender side. First, either the system or the sender (via a UI 308) can retrieve a file (e.g., .docx/excel) with multiple recipients' names and consumption formats. Alternatively, the system can generate a UI 310 for the sender to manually select the consumption formats, or to review the consumption formats. For example, the UI 310 shows Rolly and Julie is set to receive design content item via emails, Susie and Alex is set to receive design content item via SMS, while Derek is set to receive design content item via WhatsApp. As another example, a UI 312 further shows a Send button and the recipients' different design content item consumption format/data type as audio, video, text, black & white image, or the like. The system creates different URLs linking to personalized design content items for different receivers. The sender can select the Send button to send all thank-you design content items all at once. As yet another example, a UI 314 further shows five Copy Link buttons for each recipient, in case the sender wants to further personalize a respective design content item for a particular recipient.

FIG. 3C shows a scenario where the sender does not define the recipients' consumption formats. Instead, the sender sent a URL of the initial design content item i.e., the Thank You Card 302b) to each recipient via a UI 316 of a mobile device. The recipient device may transform the initial design content item (locally based on the recipient's consumption needs/preferences. Alternatively, the system retrieves the recipient's consumption needs/preferences, and transforms the initial design content item accordingly with a new URL for the recipient to view the transformed design content item. For example, Recipient 1 is set to receive it as is in a UI 318, Recipient 2 is set to receive the minimum (i.e., the text of "Thank You Alex. From Rolly") in a UI 320, while Recipient 3 is set to receive audio (e.g., the narrative of "Thank You Julie. From Rolly" and/or the narrative of the Thank You song 304b) in UI 322.

Upon a recipient's rejection of a transformed design content item, the system can directly invite user feedback on how to adjust the transformed design content item, such as font being too small, the audio being too soft, subject/background/object size too big/small, resolution too high/low, colors too bright/dark, subject similarity too high/low, style similarity too high/low (e.g., a style preservation score), and the like. In absence of such specific user feedback details, the system can automatically generate a plurality of variations for recipient selection.

In some implementations, the system provides a feedback loop by augmenting thumbs up and thumbs down buttons for each transformed design content item in the user interface 302. If the recipient dislikes a transformed design content item, the system can ask why and use the user feedback data to improve the generative model(s) 126. A thumbs down click could also prompt the user to indicate whether the transformed design content item was too bright, too dark, too big, too small, or the like.

The LMM 126a can be GPT-4V, Imagen, Contrastive Language-Image Pretraining (CLIP), Flamingo, Perceiver, Multitask Unified Model (MUM), or the like, utilized based on considerations of open source, photorealistic, creative control, computational requirements, ease of use, licensing, and the like. The generative model(s) 126 may be included as part of the application services platform 110 or they may be external models that are called by the application services platform 110. In implementations where other models in addition to the generative model(s) 126 are utilized, those models may be included as part of the application services platform 110 or they may be external models that are called by the application services platform 110.

The request processing unit 122 also coordinates communication and exchange of data among components of the application services platform 110 as discussed in the examples which follow. The request processing unit 122 receives a user request to generate personalized bulk design content items in the native application 114 or the browser application 112.

The prompt construction unit 124 may reformat or otherwise standardize any information to be included in the prompt to a standardized format that is recognized by the generative model(s) 126. The generative model(s) 126 is trained using training data in this standardized format, in some implementations, and utilizing this format for the prompts provided to the generative model(s) 126 may improve the output quality provided by the generative model(s) 126.

Some common formats recognized by a LMM include JPEG (Joint Photographic Experts Group), PNG (Portable Network Graphics, TIFF (Tagged Image File Format), BMP (Bitmap Image File), GIF (Graphics Interchange Format), PSD (Photoshop Document), RAW, SVG (Scalable Vector Graphics), WEBP, OpenEXR, or the like.

The system can instruct the generative model(s) 126 to generate a single-shot prompt (i.e., including a single example or instruction to guide the LMM's response) or a multi-shot prompt (i.e., including multiple examples or instructions to give the LMM more context and improve its understanding of the task) for generating personalized bulk design content items.

In some implementations, when the user data from the user database 128 is already in the format directly processible by the generative model(s) 126, the prompt construction unit 124 does not need to convert the user data. In other implementations, when the user data is not in the format directly processible by the generative model(s) 126, the prompt construction unit 124 converts the user data to the format directly processible by the generative model(s) 126. Some common standardized formats recognized by a language model include plain text, HTML, JSON, XML, and the like. In one embodiment, the system converts user data into JSON, which is a lightweight and efficient data-interchange format. For instance, the prompt construction unit 124 can convert the user data to a format directly processible by the LMM 126a, for example, for adjusting the personalized design content items rejected by the user. As such, the user data can be considered in adjusting the personalized design content items rejected by the user, such as bigger/smaller subject/background/object size, higher/lower resolution, brighter/darker colors, higher/lower subject similarity, higher/lower style similarity, and the like as discussed. Other implementations may include instructions in addition to and/or instead of one or more of these instructions.

In some implementations, the application services platform 110 includes moderation services that analyze user request(s)/prompt(s), design content items generated by the generative model(s) 126, and/or the user data obtained from the user database 128, to ensure that potentially objectionable or offensive content is not generated or utilized by the application services platform 110.

If potentially objectionable or offensive content is detected in the user data obtained from the user database 128, the moderation services provides a blocked content notification to the client device 105 indicating that the prompt(s), the user data is blocked from forming the meta prompt. In some implementations, the request processing unit 122 discards any user data that includes potentially objectionable or offensive content and passes any remaining content that has not been discarded to the request processing unit 122 to be provided as an input to the prompt construction unit 124. In other implementations, the prompt construction unit 124 discards any content that includes potentially objectionable or offensive content and passes any remaining content that has not been discarded to the generative model(s) 126 as an input.

In one embodiment, the prompt construction unit 124 submits the prompt(s), and/or the meta prompt(s) to the moderation services to ensure that the prompt does not include any potentially objectionable or offensive content. The prompt construction unit 124 halts the processing of the user prompt(s), and/or the meta prompt(s) in response to the moderation services determining that the user prompt(s) and/or the visual content data includes potentially objectionable or offensive content.

The prompt construction unit 124 can halt the transformation of design content items in response to the moderation services determining that the graphic design includes potentially objectionable or offensive content. The moderation services generates a blocked content notification in response to determining that the personalized bulk design content items include potentially objectionable or offensive content, and the notification is provided to the prompt construction unit 124. The prompt construction unit 124 may attempt to revise and resubmit the textual prompt. If the moderation services does not identify any issues with the transformed design content items, the prompt construction unit 124 provides the transformed design content items to the request processing unit 122. The request processing unit 122 provides the transformed design content items to the native application 114 or the browser application 112 depending upon which application was the source of the initial design content request. A technical benefit of this approach is that the moderation services provides safeguards against both user-created and model-created content to ensure that prohibited offensive or potentially offensive content is not presented to the user in the native application 114 or the browser application 112.

The user database 128 can be implemented on the application services platform 110 in some implementations. In other implementations, at least a portion of the user database 128 are implemented on an external server that is accessible by the prompt construction unit 124.

In some implementations, the application services platform 110 complies with privacy guidelines and regulations that apply to the usage of the user data included in the user database 128 to ensure that users have control over how the application services platform 110 utilizes their data. The user is provided with an opportunity to opt into the application services platform 110 to allow the application services platform 110 to access the user data and enable the generative model(s) 126 to generate transformed design content items. In some implementations, the first time that an application, such as the native application 114 or the browser application 112 presents an AI assistant to the user, the user is presented with a message that indicates that the user may opt into allowing the application services platform 110 to access user data included in the user database 128 to support the design content item transformation functionality. The user may opt into allowing the application services platform 110 to access all or a subset of user data included in the user database 128. Furthermore, the user may modify their opt-in status at any time by accessing their user data and selectively opting into or opting out of allowing the application services platform 110 from accessing and utilizing user data from the user database 128 as a whole or individually.

In one embodiment, metadata can be generated for the personalized design content items to facilitate later retrieval based on a user query. For example, the metadata might detail that transformed design content items are related to a thank-you card and a thank-you song. Consequently, the same user's query related to a thank-you card can be matched to the personalized design content items using the metadata.

A technical benefit of this approach is that the recipient consumption settings do not need to be retrieved again, and the transformed design content items do not need to be re-generated each time that the user submits a prompt to transform the same design content items in bulk. The request processing unit 122 maintains user session information in a persistent memory of the application services platform 110 and retrieves the style element data from the user session information in response to each subsequent prompt submitted by the user. The request processing unit 122 then provides the newly received user prompt(s) and the recipient consumption settings to the prompt construction unit 124 or the LMM 126a to transform design content items in bulk as discussed in the preceding examples.

The above-discussed visual content library 142 (storing e.g., initial/transformed design content items, or the like), request, prompts and responses 144, extracted/inferred user data 146 (e.g., user preferences), and other asset data 148 can be stored in the enterprise data storage 140. The extracted/inferred user data 146 (e.g., user preferences) can be collected via the above discussed user feedback loop, and is tentatively linked with a user ID during a user session and saved in a cache. After the user session, the extracted/inferred user data 146 is de-linked from the user ID as metadata of the transformed design content items and saved in the visual content library 142. In addition, the extracted/inferred user data 146 linked with the user ID is saved back to the user database 128.

The enterprise data storage 140 can be physical and/or virtual, depending on the entity's needs and IT infrastructure. Examples of physical enterprise data storage systems include network-attached storage (NAS), storage area network (SAN), direct-attached storage (DAS), tape libraries, hybrid storage arrays, object storage, and the like. Examples of virtual enterprise data storage systems include virtual SAN (vSAN), software-defined storage (SDS), cloud storage, hyper-converged Infrastructure (HCI), network virtualization and software-defined networking (SDN), container storage, and the like.

Figure 4:
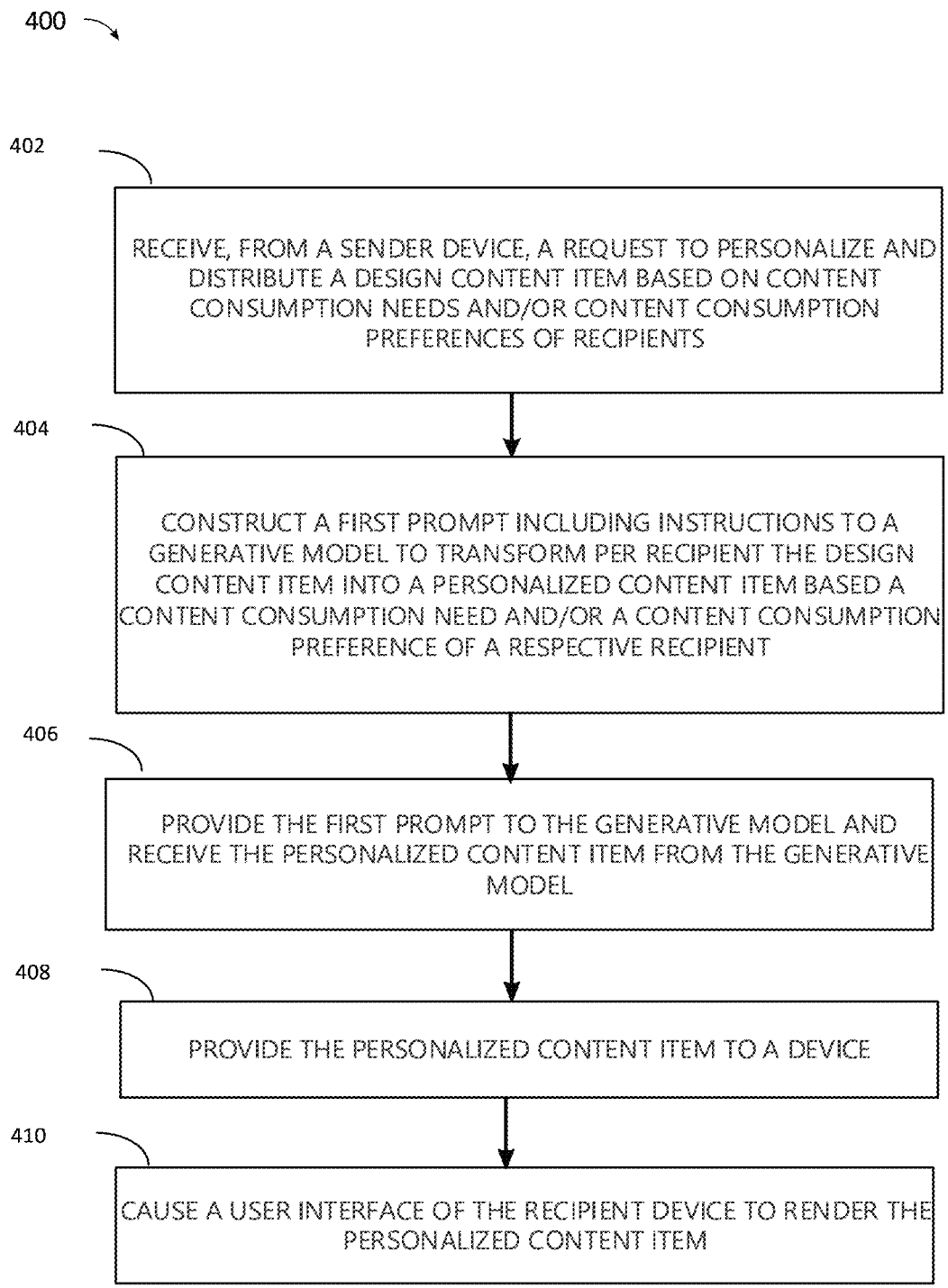
FIG. 4 is a flow chart of an example process for AI-based bulk design content creation based on personal consumption needs/preferences according to the techniques disclosed herein.
Figure 6:
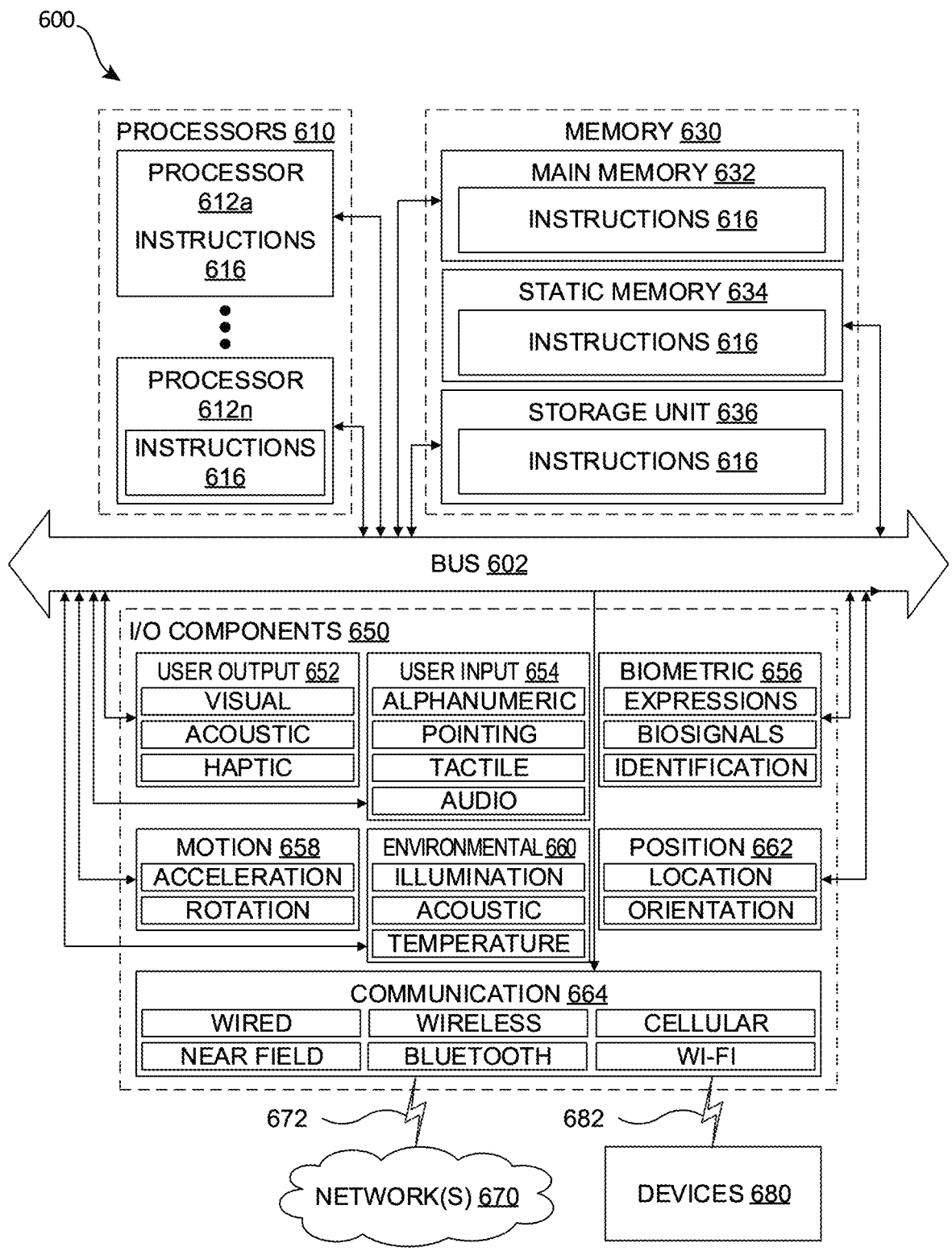
FIG. 6 is a block diagram showing components of an example machine configured to read instructions from a machine-readable medium and perform any of the features described herein.

FIG. 4 is a flow chart of an example process for AI-based bulk design content creation based on personal consumption needs/preferences according to the techniques disclosed herein. The process 400 can be implemented by the application services platform 110 or its components shown in the preceding examples. The process 400 may be implemented in, for instance, the example machine including a processor and a memory as shown in FIG. 6. As such, the application services platform 110 can provide means for accomplishing various parts of the process 400, as well as means for accomplishing embodiments of other processes described herein in conjunction with other components of the example computing environment 100. Although the process 400 is illustrated and described as a sequence of steps, it is contemplated that various embodiments of the process 400 may be performed in any order or combination and need not include all the illustrated steps.

In one embodiment, for example, in step 402, the request processing unit 122 receives from a first device (e.g., the client device 105) associated with a sender (e.g., Rolly), a request to personalize and distribute a design content item (e.g., the initial design content item 201, or the Thank You card 302b) based on at least one of content consumption needs or content consumption preferences of a plurality of recipients (e.g., the recipients 203 like R1, R2, R3, R4 in FIG. 2, or Julie Susie, Alex, Derak in FIG. 3B), and the at least one of the content consumption needs or the content consumption preferences include a data type. For example, the data type includes text, image, audio, or video.

In other embodiment, the at least one of the content consumption needs or the content consumption preferences further include at least one of a design attribute or a communication channel. For example, the design attribute includes font type, font size, color palette, texture, composition, layout, level of details, level of abstraction, overall mood, or atmosphere, and the communication channel includes at least one of email, text message, voice message, video message, or file sharing.

In step 404, a prompt construction unit (e.g., the prompt construction unit 124) constructs a first prompt (e.g., the meta prompt in Table 1 or Table 2) by appending the design content item and the at least one of the content consumption needs or the content consumption preferences to a first instruction string, the first instruction string including instructions to a generative model (e.g., the LMM 126a) to transform per recipient the design content item into a personalized content item based at least one of a content consumption need or a content consumption preference of a respective recipient. For example, the generative model is a multimodal model, and the personalized content item (e.g., the three transformed content items rendered in FIG. 3C) is provided to the second device via a uniform resource locator.

For instance, the content consumption need is caused by at least one of a physical disability (e.g., a visual impairment, a mobility limitation, an auditory impairment, a learning disability, and the like), a language barrier, or a cognitive barrier of the respective recipient. The content consumption preference can be caused by at least one of a physical preference, a language preference, or a cognitive preference of the respective recipient. In step 406, the prompt construction unit provides as an input the first prompt to the generative model and receives as an output the personalized content item from the generative model.

In step 408, the request processing unit 122 provides the personalized content item to a second device associated with the respective recipient. In step 410, the request processing unit 122 causes a user interface of the second device to render the personalized content item (e.g., the three transformed content items rendered in FIG. 3C). In some implementations, the instructions to the generative model include instructions to extract an audio transcript (e.g., the narrative of "Thank You Julie. From Rolly" and/or the narrative of the Thank You song 304b) or to generate an audio description (e.g., a Thank You Card designed in a surreal holographic glowing pastel style . . . ) from the design content item based on the at least one of the content consumption need or the content consumption preference of the respective recipient being audio, and the user interface of the second device renders the audio transcript or the audio description.

In another embodiment, the request processing unit 122 receives at least one user feedback on the personalized content item via the user interface of the second device. For example, the user feedback is collected via a user selection of at least one of a thumbs-up tab, a thumbs-down tab, a neutral tab, or a generating-more-image tab, a textual input, or a combination thereof. The prompt construction unit constructs a second prompt by appending the feedback and the personalized content item to a second instruction string, the second instruction string including instructions to the generative model to generate at least another personalized content item based on the feedback and the personalized content item, by adjusting one or more attributes of the personalized content item based on the feedback while meeting the at least one of the content consumption need or the content consumption preference.

In some implementations, the processor is embedded in the first/sensor device, the second/recipient device, or a server (e.g., of the application services platform 110 or in the cloud), while at least one of the first device (e.g., FIG. 3B), the second device (e.g., FIG. 3C), or the server determines the at least one of the content consumption need or the content consumption preference of the respective recipient.

In one embodiment, the request processing unit 122 stores user content consumption need and/or preference in a user profile, when the user signs up for a platform (e.g., a web-based collaborative platform, a social media platform, a gaming platform, or the like) or application (e.g., Microsoft Copilot®, a team collaboration application, or the like), or when the user activates the platform or application. The request processing unit 122 then applies the user profile to at least one function (e.g., emails, chat and video conferencing, file-sharing, or the like) of the platform or application in addition to the AI-based personalized bulk design content creation.

The system allows users to transform design content items in bulk for different recipients thus simplifying the creative process for the users. This ease of use increases user productivity and utilization, as well as attracting more non-technical users. By automating the personalized bulk design content creation, the system eliminates reliance on user-manually-generated design content item personalization prompts. This solution makes the personalized bulk design content creation process more efficient and open. The system can apply the personalized bulk design content creation to a range of data types, including images, images with text, videos, animations, or the like, thereby enhancing the accessibility of a design content creation platform/application for user with different content consumption needs and/or preferences.

There are security and privacy considerations and strategies for using open source generative models with enterprise data, such as data anonymization, isolating data, providing secure access, securing the model, using a secure environment, encryption, regular auditing, compliance with laws and regulations, data retention policies, performing privacy impact assessment, user education, performing regular updates, providing disaster recovery and backup, providing an incident response plan, third-party reviews, and the like. By following these security and privacy best practices, the example computing environment 100 can minimize the risks associated with using open source generative models while protecting enterprise data from unauthorized access or exposure.

In one embodiment, the application services platform 110 can store enterprise data separately from generative model training data, to reduce the risk of unintentionally leaking sensitive information during model generation. The application services platform 110 can limit access to generative models and the enterprise data. The application services platform 110 can also implement proper access controls, strong authentication, and authorization mechanisms to ensure that only authorized personnel can interact with the selected model and the enterprise data.

The application services platform 110 can also run the generative model(s) 126 in a secure computing environment. Moreover, the application services platform 110 can employ robust network security, firewalls, and intrusion detection systems to protect against external threats. The application services platform 110 can encrypt the enterprise data and any data in transit. The application services platform 110 can also employ encryption standards for data storage and data transmission to safeguard against data breaches.

Moreover, the application services platform 110 can implement strong security measures around the generative model(s) 126 itself, such as regular security audits, code reviews, and ensuring that the model is up-to-date with security patches. The application services platform 110 can periodically audit the generative model's usage and access logs, to detect any unauthorized or anomalous activities. The application services platform 110 can also ensure that any use of open source generative models complies with relevant data protection regulations such as GDPR, HIPAA, or other industry-specific compliance standards.

The application services platform 110 can establish data retention and data deletion policies to ensure that generated data (especially user data) is not stored longer than necessary, to minimizes the risk of data exposure. The application services platform 110 can perform a privacy impact assessment (PIA) to identify and mitigate potential privacy risks associated with the generative model's usage. The application services platform 110 can also provide mechanisms for training and educating users on the proper handling of enterprise data and the responsible use of generative models. In addition, the application services platform 110 can stay up-to-date with evolving security threats and best practices that are essential for ongoing data protection.

The detailed examples of systems, devices, and techniques described in connection with FIGS. 1-4 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-4 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 5:
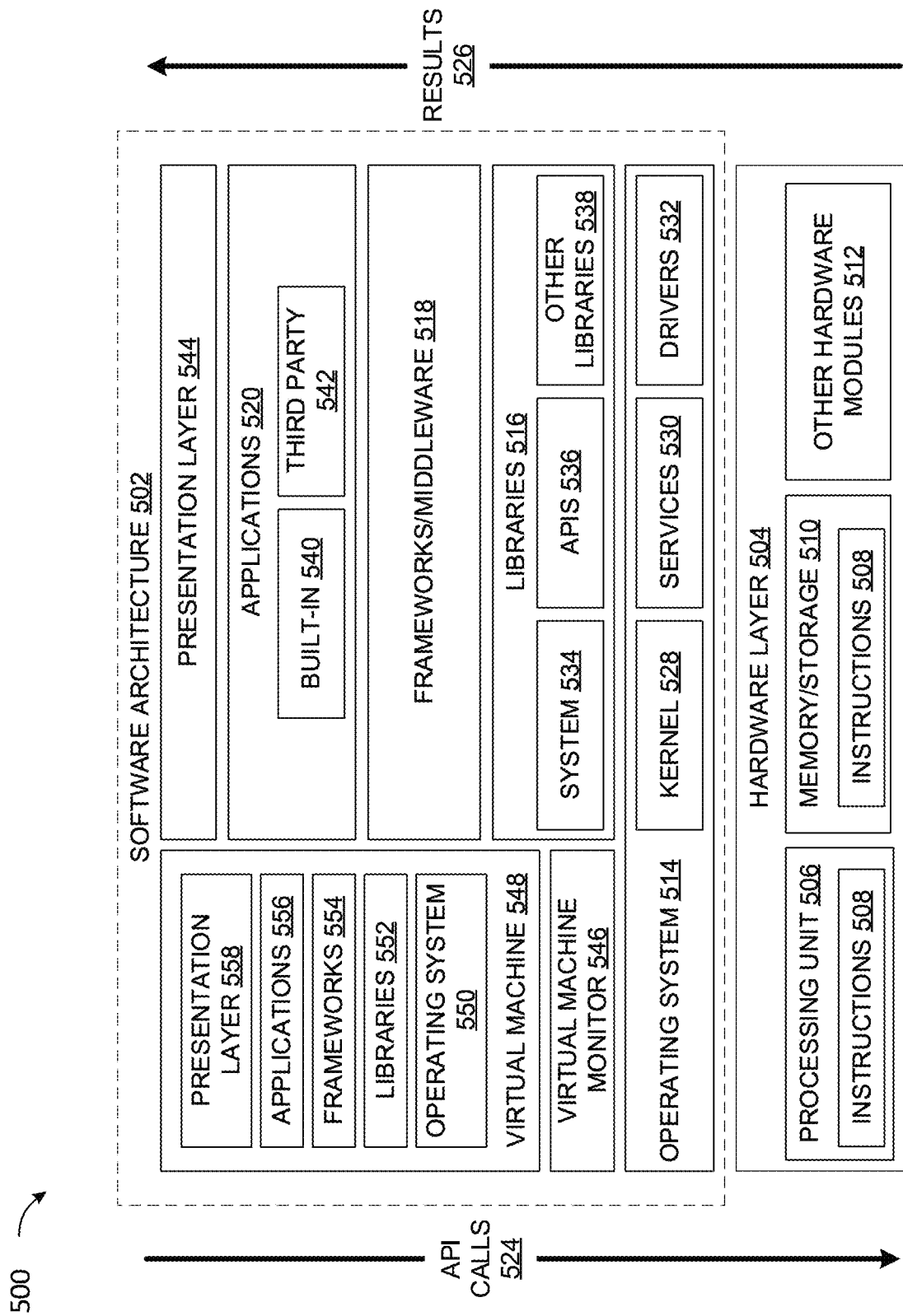
FIG. 5 is a block diagram showing an example software architecture, various portions of which may be used in conjunction with various hardware architectures herein described, which may implement any of the described features.

FIG. 5 is a block diagram 500 illustrating an example software architecture 502, various portions of which may be used in conjunction with various hardware architectures herein described, which may implement any of the above-described features. FIG. 5 is a non-limiting example of a software architecture, and it will be appreciated that many other architectures may be implemented to facilitate the functionality described herein. The software architecture 502 may execute on hardware such as a machine 600 of FIG. 6 that includes, among other things, processors 610, memory 630, and input/output (I/O) components 650. A representative hardware layer 504 is illustrated and can represent, for example, the machine 600 of FIG. 6. The representative hardware layer 504 includes a processing unit 506 and associated executable instructions 508. The executable instructions 508 represent executable instructions of the software architecture 502, including implementation of the methods, modules and so forth described herein. The hardware layer 504 also includes a memory/storage 510, which also includes the executable instructions 508 and accompanying data. The hardware layer 504 may also include other hardware modules 512. Instructions 508 held by processing unit 506 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 544. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 540 and/or third-party applications 542. Examples of built-in applications 540 may include, but are not limited to, a contacts application, a browser application, a location application, a media application, a messaging application, and/or a game application. Third-party applications 542 may include any applications developed by an entity other than the vendor of the particular platform. The applications 520 may use functions available via OS 514, libraries 516, frameworks 518, and presentation layer 544 to create user interfaces to interact with users.

Some software architectures use virtual machines, as illustrated by a virtual machine 548. The virtual machine 548 provides an execution environment where applications/modules can execute as if they were executing on a hardware machine (such as the machine 600 of FIG. 6, for example). The virtual machine 548 may be hosted by a host OS (for example, OS 514) or hypervisor, and may have a virtual machine monitor 546 which manages operation of the virtual machine 548 and interoperation with the host operating system. A software architecture, which may be different from software architecture 502 outside of the virtual machine, executes within the virtual machine 548 such as an OS 550, libraries 552, frameworks 554, applications 556, and/or a presentation layer 558.

FIG. 6 is a block diagram illustrating components of an example machine 600 configured to read instructions from a machine-readable medium (for example, a machine-readable storage medium) and perform any of the features described herein. The example machine 600 is in a form of a computer system, within which instructions 616 (for example, in the form of software components) for causing the machine 600 to perform any of the features described herein may be executed. As such, the instructions 616 may be used to implement modules or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" includes a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors 612a to 612n that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656, motion components 658, environmental components 660, and/or position components 662, among a wide array of other physical sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 658 may include, for example, acceleration sensors (for example, an accelerometer) and rotation sensors (for example, a gyroscope). The environmental components 660 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 662 may include, for example, location sensors (for example, a Global Position System (GPS) receiver), altitude sensors (for example, an air pressure sensor from which altitude may be derived), and/or orientation sensors (for example, magnetometers).

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 664 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 664, such as, but not limited to, geo-location via Internet Protocol (IP) address, location via Wi-Fi, cellular, NFC, Bluetooth, or other wireless station identification and/or signal triangulation.

In the preceding detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article, or apparatus are capable of performing all of the recited functions.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor, and
a machine-readable storage medium storing executable instructions which, when executed by the processor, cause the processor alone or in combination with other processors to perform operations of:
receiving, from a first device associated with a sender, a request to personalize and distribute a design content item based on at least one of content consumption needs or content consumption preferences of a plurality of recipients, wherein the at least one of the content consumption needs or the content consumption preferences include a data type;
constructing, via a prompt construction unit, a first prompt by appending the design content item and the at least one of the content consumption needs or the content consumption preferences to a first instruction string, the first instruction string including instructions to a generative artificial intelligence (AI) model to transform per recipient the design content item into a personalized content item based at least on a data type accessible for a physical disability of a respective recipient, wherein the personalized content item includes factual content and aesthetics of the design content item formatted in the data type;
providing as an input the first prompt to the generative AI model and receiving as an output the personalized content item from the generative AI model;
providing the personalized content item via a network to a second device associated with the respective recipient; and
causing a user interface of the second device to render the personalized content item,
wherein the processor is embedded in the first device or a server.

2. The data processing system of claim 1, wherein the machine-readable storage medium further includes instructions configured to cause the processor alone or in combination with other processors to perform operations of:
determining the at least one of the content consumption need or the content consumption preference of the respective recipient at at least one of the first device, the second device, or a server.

3. The data processing system of claim 1, wherein the content consumption needs are caused by at least one of the physical disability, a language barrier, or a cognitive barrier of the respective recipient.

4. The data processing system of claim 1, wherein the content consumption preference is caused by at least one of a physical preference, a language preference, or a cognitive preference of the respective recipient.

5. The data processing system of claim 1, wherein the data type includes a touch, smell, or taste data format, and the second device includes at least one of a digital scent device or a kinesthetic haptic device.

6. The data processing system of claim 1, wherein the machine-readable storage medium further includes instructions configured to cause the processor alone or in combination with other processors to perform operations of:
receiving at least one user feedback on the personalized content item via the user interface of the second device.

7. The data processing system of claim 6, wherein the machine-readable storage medium further includes instructions configured to cause the processor alone or in combination with other processors to perform operations of:
constructing, via the prompt construction unit, a second prompt by appending the feedback and the personalized content item to a second instruction string, the second instruction string including instructions to the generative AI model to generate at least another personalized content item based on the feedback and the personalized content item, by adjusting one or more attributes of the personalized content item based on the feedback while meeting the at least one of the content consumption need or the content consumption preference.

8. The data processing system of claim 6, wherein the user feedback is collected via a user selection of at least one of a thumbs-up tab, a thumbs-down tab, a neutral tab, or a generating-more-image tab, a textual input, or a combination thereof.

9. The data processing system of claim 1, wherein the generative AI model is a multimodal AI model.

10. The data processing system of claim 1, wherein the personalized content item is provided to the second device via a uniform resource locator.

11. The data processing system of claim 1, wherein the instructions to the generative AI model include instructions to extract an audio transcript of the factual content and to generate an audio description of the aesthetics from the design content item based on the data type accessible for the physical disability, and
wherein the user interface of the second device renders the audio transcript and the audio description.

12. The data processing system of claim 1, wherein the data type includes text, image, audio, or video.

13. A method comprising:
receiving, by a processor from a first device associated with a sender, a request to personalize and distribute a design content item based on at least one of content consumption needs or content consumption preferences of a plurality of recipients, wherein the at least one of the content consumption needs or the content consumption preferences include a data type;
constructing, by the processor via a prompt construction unit, a first prompt by appending the design content item and the at least one of the content consumption needs or the content consumption preferences to a first instruction string, the first instruction string including instructions to a generative artificial intelligence (AI) model to transform per recipient the design content item into a personalized content item based at least on a data type accessible for a physical disability of a respective recipient, wherein the personalized content item includes factual content and aesthetics of the design content item formatted in the data type;
providing as an input the first prompt by the processor to the generative AI model and receiving as an output the personalized content item from the generative AI model;
providing the personalized content item by the processor via a network to a second device associated with the respective recipient; and
causing by the processor a user interface of the second device to render the personalized content item,
wherein the processor is embedded in the first device or a server.

14. The method of claim 13, further comprising:
determining the at least one of the content consumption need or the content consumption preference of the respective recipient at at least one of the first device, the second device, or a server.

15. The method of claim 13, wherein the content consumption needs are caused by at least one of the physical disability, a language barrier, or a cognitive barrier of the respective recipient.

16. The method of claim 13, wherein the personalized content item is provided to the second device via a uniform resource locator.

17. A non-transitory computer readable medium on which are stored instructions that, when executed, cause a programmable device to perform functions of:
receiving, from a first device associated with a sender, a request to personalize and distribute a design content item based on at least one of content consumption needs or content consumption preferences of a plurality of recipients, wherein the at least one of the content consumption needs or the content consumption preferences include a data type;
constructing, via a prompt construction unit, a first prompt by appending the design content item and the at least one of the content consumption needs or the content consumption preferences to a first instruction string, the first instruction string including instructions to a generative artificial intelligence (AI) model to transform per recipient the design content item into a personalized content item based at least on a data type accessible for a physical disability of a respective recipient, wherein the personalized content item includes factual content and aesthetics of the design content item formatted in the data type;
providing as an input the first prompt to the generative AI model and receiving as an output the personalized content item from the generative AI model;
providing the personalized content item via a network to a second device associated with the respective recipient; and
causing a user interface of the second device to render the personalized content item,
wherein the programmable device is embedded in the first device or a server.

18. The non-transitory computer readable medium of claim 17, wherein the instructions when executed, further cause the programmable device to perform functions of:
determining the at least one of the content consumption need or the content consumption preference of the respective recipient at at least one of the first device, the second device, or a server.

19. The non-transitory computer readable medium of claim 17, wherein the content consumption needs are caused by at least one of the physical disability, a language barrier, or a cognitive barrier of the respective recipient.

20. The non-transitory computer readable medium of claim 17, wherein the personalized content item is provided to the second device via a uniform resource locator.

* * * * *